United States Patent [19]

Fiala

[11] Patent Number: 4,958,557
[45] Date of Patent: Sep. 25, 1990

[54] RENDERED FAT SEPARATOR

[76] Inventor: Jeffrey Fiala, P.O. Box 302, Brookfield, Ill.

[21] Appl. No.: 422,687

[22] Filed: Oct. 17, 1989

[51] Int. Cl.⁵ .......................... A47J 19/00; B30B 9/02
[52] U.S. Cl. ..................................... 99/495; 100/125; 100/132
[58] Field of Search ................. 99/495, 349, 355, 353, 99/502, 503, 504, 507, 505, 510, 574; 100/910, 116, 125, 132, 227, 289, 295, 213; 141/364; 241/168, 169.1, 83, 84; 425/406, 410, 394, 398, 401, 416, 418, 419, 420; 426/512, 513, 516

[56] References Cited

U.S. PATENT DOCUMENTS

| | | | |
|---|---|---|---|
| 608,268 | 8/1898 | Pelton | 100/125 X |
| 769,015 | 8/1904 | Peirce | 100/125 |
| 985,583 | 2/1911 | Granger | 100/289 |
| 1,535,769 | 4/1925 | Gallardo | 100/125 X |
| 2,362,154 | 11/1944 | Patrick | 100/125 |
| 2,818,797 | 1/1958 | Ballor | 100/116 X |
| 4,348,950 | 9/1982 | Harris | 100/125 X |
| 4,389,926 | 6/1983 | Joyner | 99/495 |
| 4,640,185 | 2/1987 | Joyner | 99/495 |

FOREIGN PATENT DOCUMENTS

| | | | |
|---|---|---|---|
| 791529 | 12/1935 | France | 100/116 |
| 266927 | 8/1929 | Italy | 99/507 |
| 39911 | 3/1915 | Sweden | 100/125 |
| 176868 | 10/1935 | Switzerland | 99/502 |

Primary Examiner—Harvey C. Hornsby
Assistant Examiner—Scott J. Haugland
Attorney, Agent, or Firm—Dvorak and Traub

[57] ABSTRACT

A rendered fat separator comprising a bowl having a perforated bottom for receiving cooked fatty meat to be compressed by a rotary press threadedly engaged with the bowl, the rotary press having a socket for accepting a driving sprocket provided with flutes and having a handle which rotates the driving socket in threaded engagement with engageable means on the inner surface of the bowl.

11 Claims, 2 Drawing Sheets

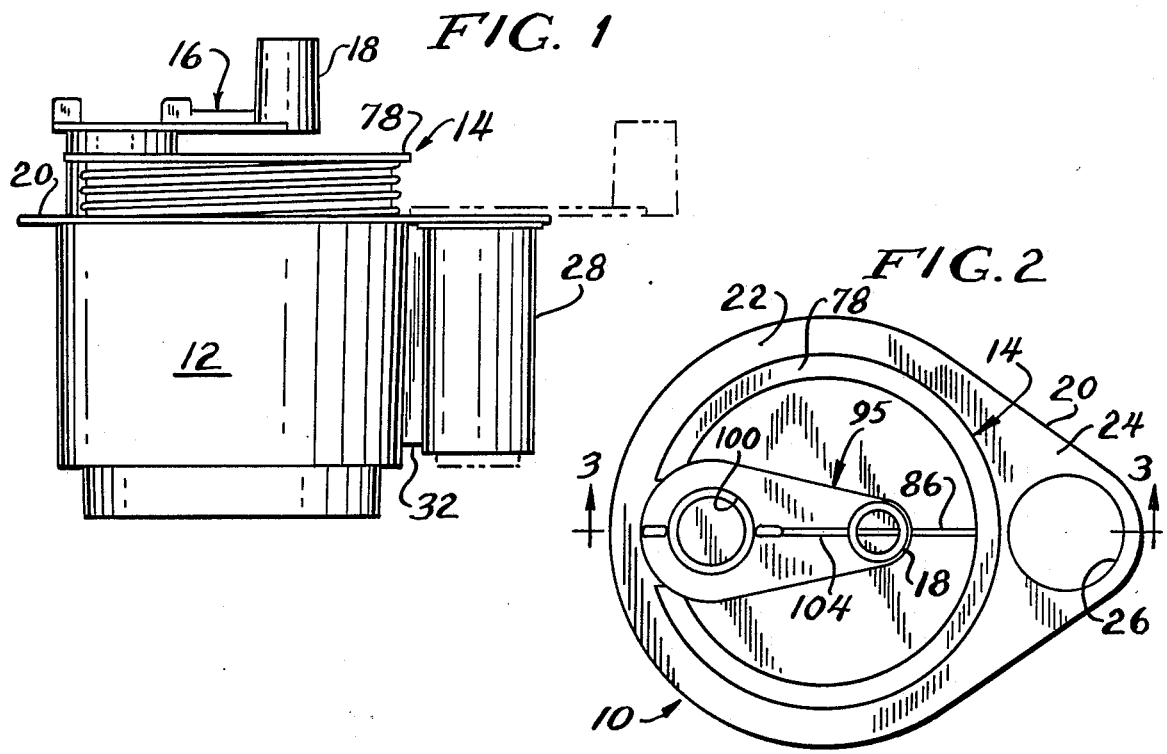
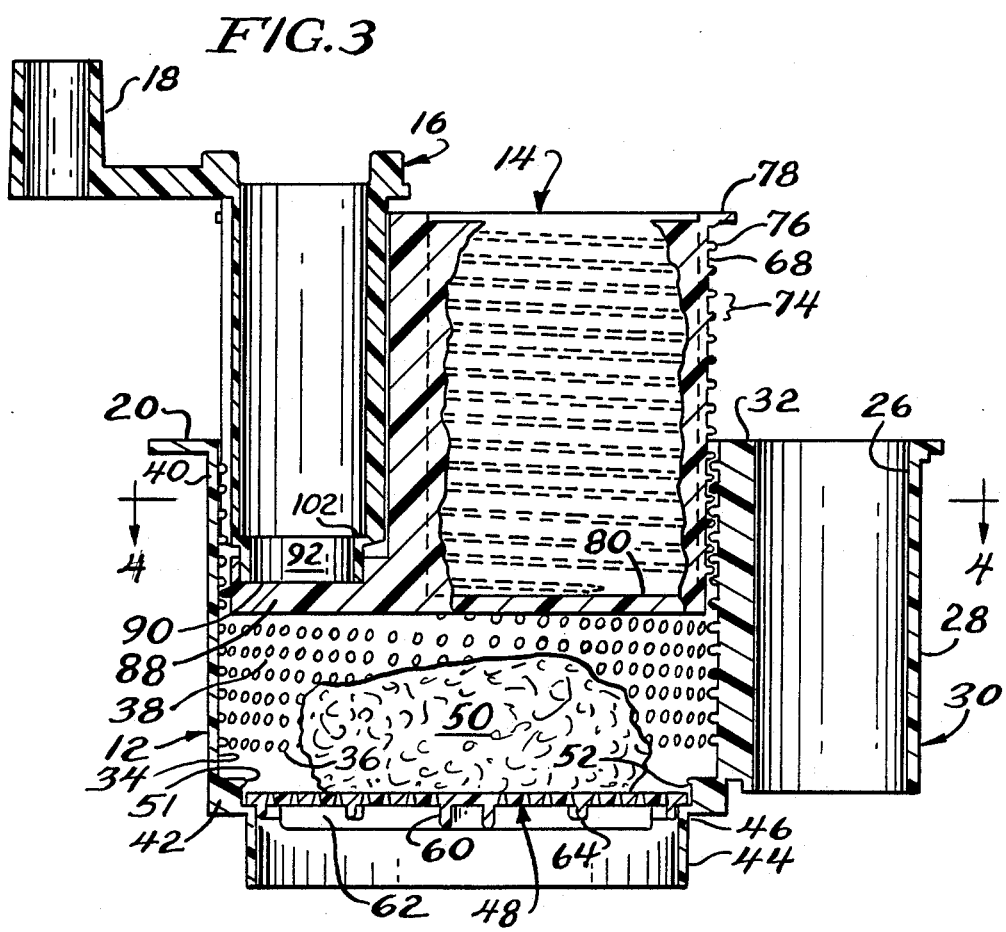

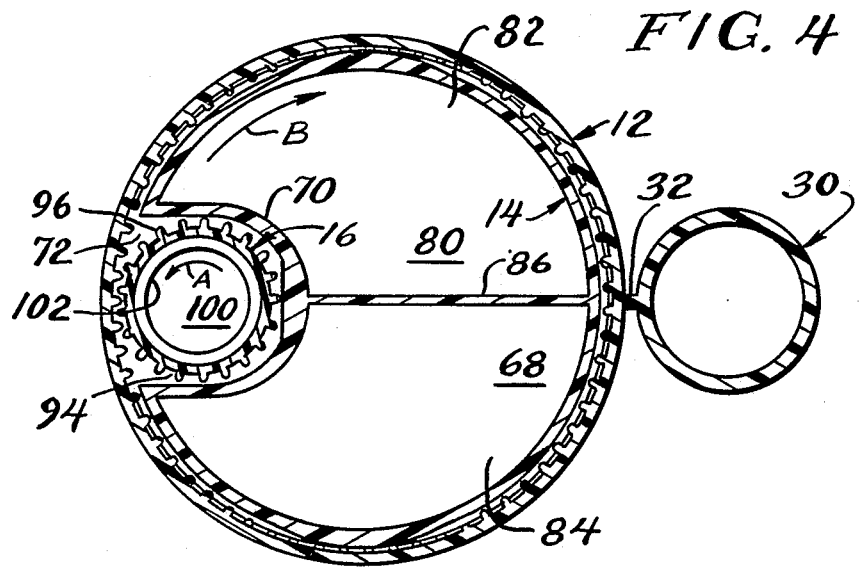
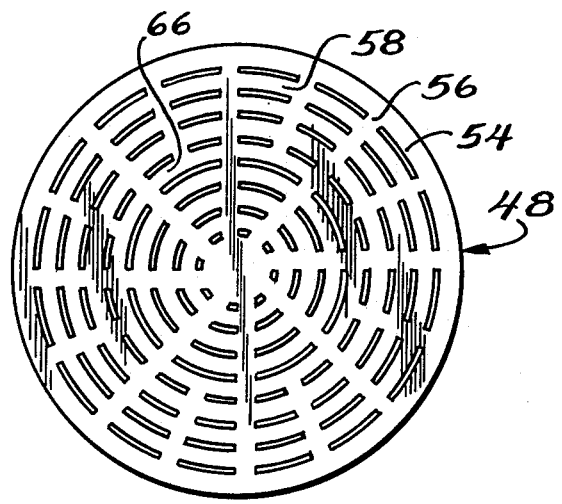
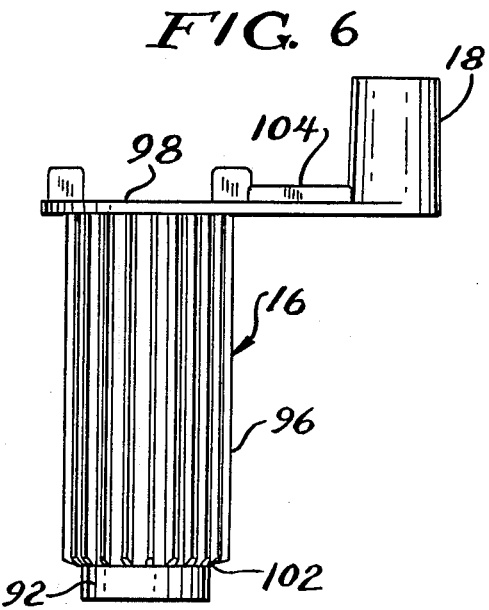

RENDERED FAT SEPARATOR

BACKGROUND OF THE INVENTION

1. Field of the Invention

This invention is generally concerned with a device for separating a liquid from a solid, and more particularly, with a device for separating rendered fat from cooked ground meat.

2. Description of the Prior Art

In the field of preparing food for consumption by humans, various devices have been used for separating components of a liquid derived from a cooking process, such as separating fat from gravy derived during roasting or other cooking process. For example, U.S. Pat. Nos. 4,389,926 and 4,640,185 describe separators for separating liquid gravy from fats rendered during the cooking process. However, nothing has been developed to separate a liquid from a solid, such as rendered fat from cooked ground meat. The usual method of removing excess fat from cooked ground meat is to pour off the excess from the top of the container in which the ground meat was cooked. As an alternative process, the cooked ground meat would be placed in a colander or a sieve and set aside for the fat to work itself out by gravity into a collecting receptacle. However, gravity alone is insufficient to remove most of the fat from the cooked meat.

SUMMARY OF THE INVENTION

In view of the public awareness of health problems associated with high levels of blood cholesterol, as well as the problem of gaining weight from consumption of unnecessary fats, there has been developed a separator in the form of a manually-operated rotary press for squeezing out liquefied fat from the cooked ground meat. The separator comprises essentially a cooked meat receiving housing having an internal surface provided with thread-engaging means adapted to engage with a complementary thread-engaging means on the exterior surface of a rotary press which is forced against the bottom of the food-receiving housing by a driving sprocket which may be provided with a handle for forcing the rotary press against the cooked meat to force out the liquefied fat through a perforated bottom of the food-receiving housing.

The apparatus disclosed hereinafter removes a far greater content of liquefied fat from cooked meat than would be achieved by draining or pouring-off of the liquefied fat.

The main object of the invention is to provide a particularly constructed liquefied fat separator which can be manually operated to press out liquefied fat from the cooked ground meat.

Another object of the invention is to provide components of a structure to provide a press operated by a driving sprocket to obtain a mechanical advantage in increasing the force applied to the rotary press for squeezing out most of the liquefied fat from the cooked meat.

Another object of the invention is to provide a separator made from material which is acceptable for heating in a microwave range.

A still further object of the invention is to provide a rotary press to apply simultaneously compressive and shearing forces to obtain more efficient squeezing for substantial removal of the liquefied fat.

A further object of the invention is to provide a device which uses a screw type of squeezing action, wherein the screw threads of one of the engaging members has the screw thread made of successive nibs, in order to eliminate the clogging of the threads by cooked meat which is being pressed.

BRIEF DESCRIPTION OF THE DRAWINGS

FIG. 1 is a side elevation view of a fat separator showing all components in assembled form;

FIG. 2 is a top plan view of the fat separator shown in FIG. 1;

FIG. 3 is a cross-sectional view of the fat separator as shown along the line 3—3 in FIG. 2, but with a handle extending outwardly;

FIG. 4 is a cross-sectional view of the fat separator along the line 4—4 in FIG. 3;

FIG. 5 is a plan view of a perforated bottom through which rendered fat is extracted; and FIG. 6 is a plan view of a driving sprocket for driving a rotary press with respect to the food-receiving housing.

PREFERRED EMBODIMENT OF THE INVENTION

As shown in FIGS. 1-3, a fat separator 10 comprises essentially three components, namely, a food-receiving housing or bowl 12, a rotary press 14, and a driving sprocket 16 manually operable by a handle 18. The bowl 12, at its upper end, defines a skirt 20 which has a circular portion 22 enlarging into convolution portion 24 having a bore 26 defined by a cylindrical wall 28, as best viewed in FIG. 3, and performing as a sprocket-storing receptacle 30, when the fat separator 10 is stored.

The food-receiving bowl 12 is integrally formed with the rotor-storing receptacle 30 by means of a junction wall 32. An inner wall surface 34 of the bowl 12 is integrally provided with a plurality of nibs 36 which are vertically spaced from each other by a distance of approximately 0.5 centimeters in one plane. The nibs 36 are also spaced transversely from each other by a similar distance of about 0.5 centimeters in another plane. However, the nibs along the transverse direction are arranged along a helical path 38, as shown in FIG. 3. The bowl 12 has a wall 40 which extends from the skirt 20 to a bottom rim 42, as shown at the lower portion of FIG. 3, and terminates in a reduced opening 44 having a diameter of approximately 4.5 inches, and which can be placed over a vessel, for example, a coffee can, which can be readily disposed with the collected fat. The vertical disposition of the nibs 36 extends slightly below the skirt 20 and slightly above the bottom rim 42.

The reduced opening 44 and the bottom rim 42 cooperatively define a seat 46 for rotatably supporting a perforated bottom 48 which has peripheral clearance with respect to the bottom rim so that it can rotate freely when food 50 is placed on the perforated bottom and then subjected to rotational pressure. The bottom rim 42 has a peripheral lip 51 which maintains the perforated bottom 48 within a groove 52 in the bottom rim 42. In assembling the fat separator 10, the perforated bottom 48 is snapped into the groove 52 in the bowl 12.

The perforated bottom 48, as shown in FIG. 5, has a plurality of slits 54 separated by rays 56 and arranged in a circular fashion concentric to the center of the perforated bottom 48. The slits 54 are also spaced radially from each other by rings 58. To prevent the deformation in the central area of the perforated bottom 48, as shown in FIG. 3, the underside of the perforated bottom 48, in the center thereof, is provided with a cup 60 integrally molded with a plurality of radially extending reenforcement ribs 62 which are integrally formed with the rays 56. Additionally, the perforated bottom 48 is provided with a reenforcing ring 64 which integrally intersects the reenforcing ribs 62, and which underlies ring 66.

Referring to FIGS. 3 and 4, the rotary press 14 has a wall 68 which is substantially cylindrical and concentric to the inner wall surface 34 of the bowl 12 except in an area defining a well 70 which forms with respect to a portion of the bowl 12, an enclosure 72 which is adapted to receive the driving sprocket 16. The external surface of the wall 68 of the rotary press 14 is formed with helical grooves 74 defined by a plurality of spaced-apart helical ribs 76, the helical groove 74 being adapted to engage with the nibs 36 on the inside surface of the bowl 12. As shown in FIGS. 1-3, the rotary press 14 is provided at its upper portion with a lip 78. The rotary press 14 has a bottom 80 subdivided into two portions 82 and 84 by a reenforcing wall or vane 86 which extends from the lip 78 to the bottom 80. The reenforcing wall 86 extends from the inner surface of the wall 68 to the well 70. The wall or vane 86 can be used to provide gripping by one's fingers for direct turning of the press 14. The foregoing arrangement prevents buckling of the bottom 80 when pressure is applied to the food The bottom 80 may have extra thickness to provide extra strength As shown in FIG. 3, the bottom 80 includes a socket 90 which is formed for accepting a rotor head 92 of the driving sprocket 16, as shown in FIG. 6.

Referring to FIGS. 4 and 6, the driving sprocket 16 has a cylindrical wall 94 having an exterior surface formed with a plurality of flutes 96 which extend vertically from a flange 98 up to the rotor head 92. The cylindrical wall 94 has a bore 100 which extends from the flange 98 up to a shoulder 102 which forms a part of the rotor head 92. As shown in FIG. 2, the tapered portion of the flange 98 terminates in a handle 18. The flange 98 is provided with a reenforcing rib 104 to prevent deflection in the flange.

When the user is ready to use the fat separator 10, the driving sprocket 16 is removed from the sprocket storing receptacle 30. Food 50 is then placed on the perforated bottom 48 in the bowl 12. Thereafter, the rotary press 14 is placed on top of the bowl 12 and rotated clockwise to engage the helical groove 74 with the nibs 36 helically distributed on the inside surface of the bowl 12. After an engagement of two or three turns, or when resistance is encountered, the driving sprocket 16 is placed in the well 70 of the rotary press 14 to position the rotary head 92 in the socket 90. At this time, the flutes 96 engage with the nibs 36. By applying a counterclockwise rotation to the handle 18, the driving sprocket 16 will rotate counterclockwise as shown by the arrow A in FIG. 4, causing the rotary press 14 to rotate in a clockwise direction as indicated by an arrow B in FIG. 4. The movement of the rotary press 14 in a clockwise direction will carry the well 70 and the engaged driving sprocket 16 in a planetary movement along the inner peripheral surface of the bowl 12 until the bottom 80 of the rotary press 14 engages the food 50 resting on top of the bottom 48. At this time, the food 50 will offer increasing resistance to the movement of the rotary press 14 as the rotary press is screwed further into the bowl 12. The diameter of the cylindrical wall 94 of the driving sprocket 16 is about 3.8 cm., and the inner diameter of the bowl 12 is about 13 cm. A mechanical advantage of about 3.5 is developed when the driving sprocket 16 is rotated with the handle 18, to cause the rotary press to screw downwardly into the bowl 12 against the food 50. Thereby an efficient separation of the rendered fat from the cooked meat is obtained, as opposed to a situation where a rotary press 14 having a smooth external wall is forced into a bowl having a smooth internal wall. In addition, it should be noted that the force applied to the bottom 80 of the rotary press is not merely downwardly applied to the food 50, but also there is generated a rotary pressing applied to the food so that a distribution of the food is obtained while the pressing continues downwardly and in a rotary manner. The rotary movement of the bottom 80 against the food 50 provides a shearing force to more efficiently squeeze out the rendered fat from the meat.

If it should occur that the food 50 will cool excessively, and the liquefied fat in the meat will resist further extraction, the food separator 10 and the food therein may be placed in a microwave oven and heated to bring up the temperature in the meat to improve the liquefaction of the rendered fat for further extraction with the fat separator 10.

As stated before, application of manual force to the handle 18 of the driving sprocket 16 will cause the bottom 80 of the rotary press 14 to apply simultaneously compressive and shearing forces to the food to squeeze out the fat through the perforated bottom 48. Upon completion of separation of fat from the meat, the separator 10 is taken apart to remove the rotary press and the driving sprocket. The bowl 12 is then inverted and the compressed cooked meat in the form of a large disc is released and is ready for further cooking processing, if necessary. Thereafter, all of the components of the fat separator are washed to remove the fat and food particles. After the washing is completed, the driving sprocket 16 is placed in its sprocket storing receptacle 30, as shown in phantom in FIG. 1.

Although a particular preferred embodiment of the invention has been disclosed above for illustrative purposes, it will be understood that variations or modifications thereof which lie within the scope of the appended claims are fully contemplated.

What is claimed is:

1. An apparatus for separating rendered fat from cooked food, comprising a perforate bowl means for receiving the food, rotary press means for applying a force to said food to squeeze out said rendered fat, engageable means intercoupling said rotary press means with said bowl means to provide a travel path for said rotary press means toward said food, and driving sprocket means cooperatively engaged with said bowl-like means, the engageable means and said rotary press means for forcing said rotary press means against said food to extract a substantial amount of said rendered fat.

2. Apparatus according to claim 1 wherein said engageable means comprises a helical track defined on an inner wall of said bowl means, and a complementary helical track defined on an outer wall of said rotary press means engageable with said helical track on said bowl means.

3. Apparatus according to claim 1, including a manually operable member coupled to said driving sprocket means for rotating said rotary press for movement along a helical path in a direction toward said food.

4. Apparatus according to claim 1, including a storage receptacle for storing said driving sprocket means when said driving sprocket is not in engagement with said bowl means and said rotary press means.

5. Apparatus according to claim 4, wherein said storage receptacle is integrally formed with an exterior wall of said bowl means.

6. Apparatus according to claim 1, said perforated bowl means having a food supporting bottom provided with a plurality of narrow slits providing an exit for the squeezed out rendered fat.

7. Apparatus according to claim 6, wherein said bottom is provided with reinforcing ribs and rays to prevent deformation of said narrow slits.

8. Apparatus according to claim 6, wherein said bowl means has a reduced opening below said bottom to be positioned over a disposable vessel to receive the extracted rendered fat.

9. Apparatus according to claim 1, wherein said rotary press means comprises a peripheral wall defining an interior region a reinforcing wall extending from said peripheral wall and having an end spaced from the peripheral wall a "U"-shaped well at said end of said reinforcing wall defining a partial enclosure for receiving said driving sprocket means.

10. Apparatus according to claim 9, wherein said driving sprocket means includes a rotor head and said well has a closed end which includes a socket for receiving said rotor head of said driving means.

11. Apparatus according to claim 1, wherein the engageable means comprise a plurality of nibs extending outwardly out of an interior wall of said bowl means, said nibs being spaced vertically from each other and being spaced transversely from each other along a helical path and rib defining a helical groove on an external wall of said rotary press means, and said driving sprocket means has a cylindrical wall formed with a plurality of spaced flutes extending parallel to the longitudinal axis of said rotary press means, said flutes adapted to engage drivingly with said nibs.

* * * * *